US012623236B2

(12) United States Patent
Cogswell

(10) Patent No.: US 12,623,236 B2
(45) Date of Patent: May 12, 2026

(54) SYSTEMS AND METHODS OF SPRINKLER DEFLECTOR DEPLOYMENT

(71) Applicant: Tyco Fire Products LP, Lansdale, PA (US)

(72) Inventor: Jeremy Cogswell, Johnston, RI (US)

(73) Assignee: Tyco Fire Products LP, Cranston, RI (US)

( * ) Notice: Subject to any disclaimer, the term of this patent is extended or adjusted under 35 U.S.C. 154(b) by 639 days.

(21) Appl. No.: 17/918,076

(22) PCT Filed: Jun. 28, 2021

(86) PCT No.: PCT/IB2021/055775
§ 371 (c)(1),
(2) Date: Oct. 10, 2022

(87) PCT Pub. No.: WO2022/003543
PCT Pub. Date: Jan. 6, 2022

(65) Prior Publication Data

US 2023/0158518 A1 May 25, 2023

Related U.S. Application Data

(60) Provisional application No. 63/045,306, filed on Jun. 29, 2020.

(51) Int. Cl.
*B05B 1/26* (2006.01)
*A62C 37/08* (2006.01)
(Continued)

(52) U.S. Cl.
CPC ................ *B05B 1/26* (2013.01); *A62C 37/08* (2013.01); *A62C 37/09* (2013.01); *B05B 12/12* (2013.01)

(58) Field of Classification Search
CPC ............ B05B 1/26; A62C 37/08; A62C 37/09
See application file for complete search history.

(56) References Cited

U.S. PATENT DOCUMENTS

| | | | |
|---|---|---|---|
| 4,880,063 | A | 11/1989 | Leininger et al. |
| 6,082,465 | A | 7/2000 | Retzloff |

(Continued)

FOREIGN PATENT DOCUMENTS

| | | | |
|---|---|---|---|
| CN | 210751033 | U | 6/2020 |
| JP | 3014504 | U | 8/1995 |
| JP | 2004-141647 | A | 5/2004 |

OTHER PUBLICATIONS

Korean Intellectual Property Office as International Searching Authority; International Search Report and Written Opinion; PCT/IB2021/055775; Oct. 6, 2021; 8 pages.

*Primary Examiner* — Tuongminh N Pham
(74) *Attorney, Agent, or Firm* — Foley & Lardner LLP

(57) ABSTRACT

A sprinkler includes a connector, a body, at least one pin, and a deflector. The connector extends between an inlet end and an outlet end. The body includes a pin wall extending from the outlet end of the connector. The pin wall defines at least one pin receiver. The body wall extends from the pin wall. The pin wall and the body wall define a chamber. The at least one pin is fixed with the at least one pin receiver. The deflector is coupled with the at least one pin to move within the chamber along the at least one pin responsive to a trigger condition from an undeployed state to a deployed state.

17 Claims, 2 Drawing Sheets

(51) Int. Cl.
*A62C 37/09* (2006.01)
*B05B 12/12* (2006.01)

(56) References Cited

U.S. PATENT DOCUMENTS

| | | | | |
|---|---|---|---|---|
| 6,123,153 | A * | 9/2000 | Finnegan | A62C 31/02 169/56 |
| 8,573,316 | B2 | 11/2013 | Polan et al. | |
| 2003/0111237 | A1 * | 6/2003 | Sato | A62C 31/02 169/37 |
| 2010/0263883 | A1 * | 10/2010 | Abels | A62C 31/02 169/37 |
| 2011/0030977 | A1 * | 2/2011 | Polan | A62C 31/02 169/37 |

* cited by examiner

SYSTEMS AND METHODS OF SPRINKLER DEFLECTOR DEPLOYMENT

CROSS-REFERENCE TO RELATED APPLICATIONS

The present application claims the benefit of and priority to U.S. Provisional Application No. 63/045,306, filed Jun. 29, 2020, the disclosure of which is incorporated herein by reference in its entirety.

BACKGROUND

Fire protection systems can use sprinklers to output fluids to address fire conditions. The sprinklers can be mounted in various locations in a building, and can be mounted in a concealed configuration.

SUMMARY

At least one aspect relates to a sprinkler. The sprinkler can include a connector, a body, at least one pin, and a deflector. The connector extends between an inlet end and an outlet end. The body includes a pin wall extending from the outlet end of the connector. The pin wall defines at least one pin receiver. The body wall extends from the pin wall. The pin wall and the body wall define a chamber. The at least one pin is fixed with the at least one pin receiver. The deflector is coupled with the at least one pin to move within the chamber along the at least one pin responsive to a trigger condition from an undeployed state to a deployed state.

At least one aspect relates to a sprinkler system. The sprinkler system can include one or more pipes coupled with a fluid supply and a sprinkler. The sprinkler includes a connector, a pin wall, at least one pin, and a deflector. The connector extends between an inlet end and an outlet end. The pin wall extends from the outlet end of the connector and defines at least one pin receiver. The at least one pin is fixed with the at least one pin receiver. The deflector is coupled with the at least one pin to move along the at least one pin responsive to a trigger condition from an undeployed state to a deployed state.

At least one aspect relates to a deflector assembly. The deflector assembly can include a plurality of pins that engage with a sprinkler and a deflector. The deflector includes a plurality of deflector arms that extend outward from a longitudinal axis. Each deflector arm of the plurality of deflector arms defines a receiver coupled with a respective pin of the plurality of pins. The plurality of deflector arms move along the plurality of pins and parallel with the longitudinal axis responsive to a trigger condition from an undeployed state to a deployed state. Each pin of the plurality of pins includes a flange to restrict movement of a respective deflector arm of the plurality of deflector arms beyond the deployed state.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of sprinkler systems and methods. Fire sprinklers can be used to address fire conditions by outputting fire suppression agents, such as water or other fire suppression fluids, to address the fire. The fire sprinklers (or the fire suppression agent delivered to the fire sprinklers) can be controlled to selectively output fire suppression agents. The various concepts introduced above and discussed in greater detail below can be implemented in any of numerous ways, including in sprinkler systems that implement concealed sprinklers (e.g., sprinklers installed in a manner that can reduce the physical extension and visibility of the sprinkler beyond the walls of the building) and non-concealed sprinklers.

Sprinklers can be installed by connecting the sprinklers with piping that is connected with a fluid supply. For example, in buildings, including residential buildings, sprinklers may be installed so that a body of the sprinkler is positioned in a particular location relative to a wall or ceiling. Locating the sprinkler properly during installation may be limited by factors such as the position of the piping relative to the wall or ceiling and a target location for a deflector of the sprinkler during operation.

Systems and methods in accordance with the present disclosure can use a sprinkler that includes a deflector that moves along a plurality of pins in a body of the sprinkler from a first, undeployed position to a second, deployed position. This can enable a more flexible range of locations for aligning the sprinkler with the piping, including for concealed and non-concealed sprinkler implementations. For example, the relative positioning of the sprinkler and the deflector in the undeployed position can be varied, such as during installation of the sprinkler.

Figure 1:
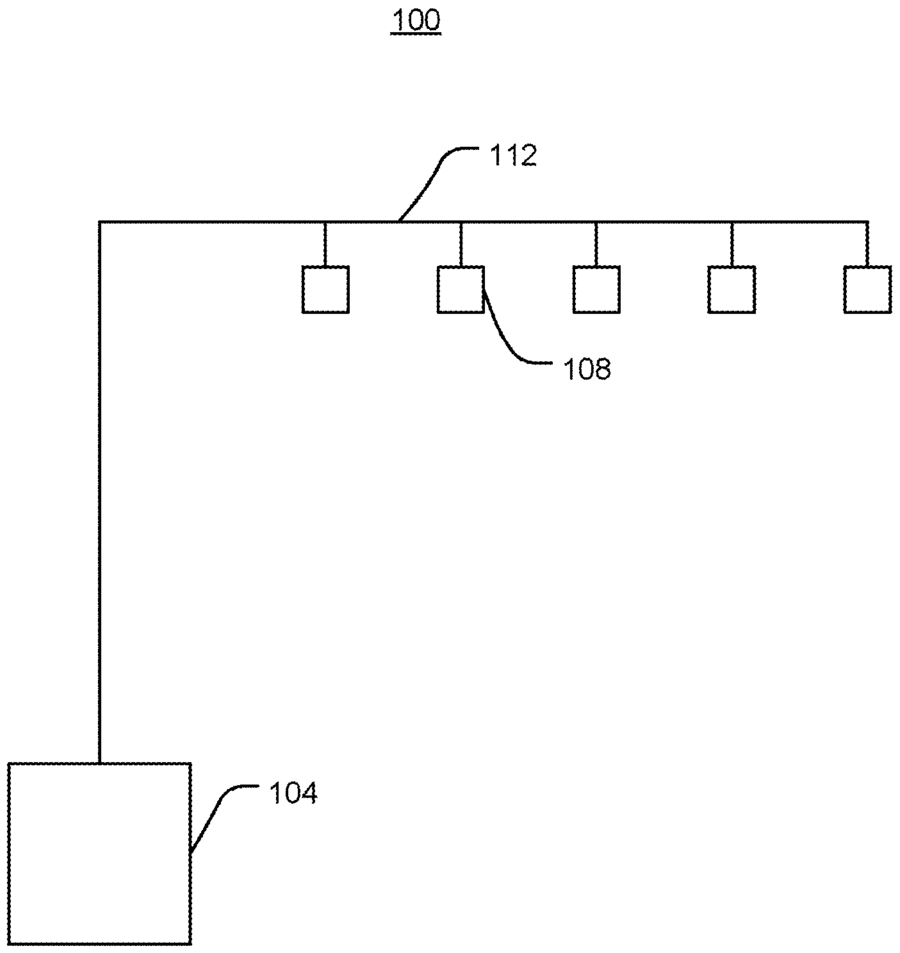
FIG. 1 is a schematic diagram of an example of a sprinkler system.

FIG. 1 depicts an example of a sprinkler system 100. The sprinkler system 100 can be used in a variety of applications. The sprinkler system 100 can be used with a variety of fire suppressant agents, including but not limited to water (e.g., may use powders, liquids, foams, or other fluid or flowable materials).

The sprinkler system 100 can include a fluid supply 104 coupled with one or more sprinklers 108 using one or more pipes 112. The fluid supply 112 can define an internal volume filled (e.g., partially filled, completely filled) with fire suppressant agent. The fluid supply 112 can provide fluid from a remote or local location to a building in which the fire suppression system 100 is located. The fluid supply may include, for example, a municipal water supply, pump, piping system, tank, cylinder, or any other source of water or fire suppression agent. The pipes 112 (e.g., one or more pipes, tubes, conduits) can be fluidly coupled with the one or more sprinklers 108.

Figure 2:
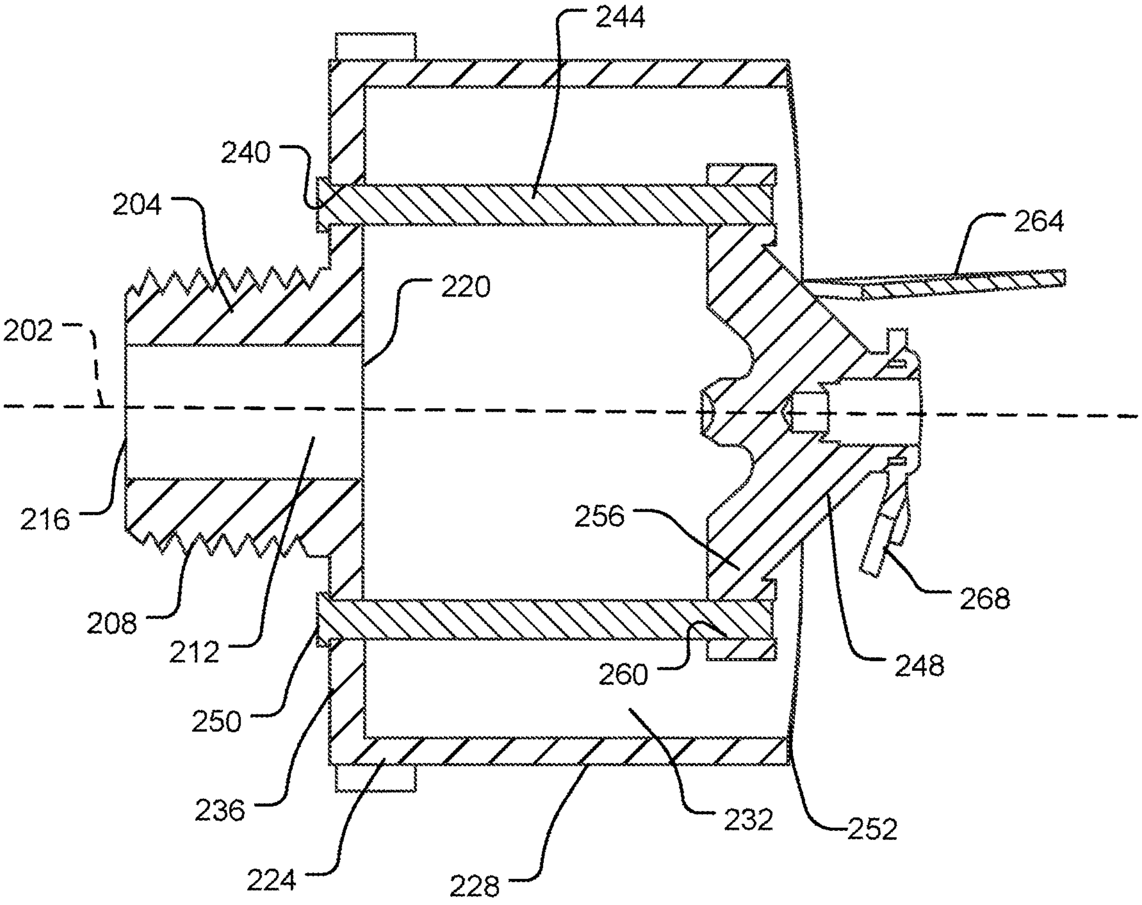
FIG. 2 is a section view of an example of a sprinkler of a sprinkler system.

The sprinkler 108 can be actuated responsive to a fire condition, causing fluid to flow from the fluid supply 104 through the one or more pipes 112 and out of the sprinkler 108. The pipes 112 can extend through a building into a space between walls of the building. The sprinklers 108 can be installed in various applications, including horizontal sidewall, pendent, concealed, and non-concealed applications. The sprinklers 108 can be installed adjacent to sidewalls or ceilings of buildings, including in residential buildings. In various such applications, the sprinkler 108 can FIG. 2 depicts an example of the sprinkler 108. The sprinkler 108 includes a connector 204. The connector 204 can be connected with the one or more pipes 112 to receive fluid from the fluid supply 104 as described with reference to FIG. 1. The connector 204 can include an engagement member 208, such as threading, to connect with the one or more pipes 112 (or an adapter coupled with the one or more pipes 112).

The connector 204 can receive fluid through a channel 212 that extends from an inlet end 216 to an outlet end 220 along a longitudinal axis 202. The sprinkler 108 can have a K-factor of 4.2 [gpm]/[psi]$^{1/2}$ (e.g., for residential applications). The sprinkler 108 can have a K-factor of 5.6 [gpm]/[psi]$^{1/2}$ (e.g., for commercial applications).

The sprinkler 108 includes a body 224 that extends from the outlet end 220 of the connector 204. The body 224 can include a body wall 228 that defines a chamber 232 connected with the channel 212. The chamber 232 can have a greater diameter than the channel 212, such as to allow components such as deflector 248 to be received within the chamber 232 while allowing the connector 204 to be sized to connect with the pipes 112 (or an adapter coupled with the pipes 112). The body wall 228 can be spaced from and extend around the longitudinal axis 202. The body 224 can include a pin wall 236 that extends between the connector 204 and the body wall 228. The pin wall 236 can extend transverse (e.g. perpendicular to) the longitudinal axis 202 and can intersect the longitudinal axis 202.

The pin wall 236 can define at least one pin receiver 240. The pin receivers 240 can be defined outward from the connector 204 relative to the longitudinal axis 202. For example, the pin receivers 240 can be between the connector 204 and the body wall 228.

The pin receivers 240 can receive and be coupled with (e.g., fixed with) at least one corresponding pin 244. The pins 244 can be fixed to the pin wall 236, and can include flanges 250 to prevent movement of the pins 244 relative to the pin wall 236. For example, the flanges 250 can have a greater width than the pin receivers 240 in a direction in which the flanges 250 extend transverse to the longitudinal axis 202 to prevent movement of the pins 244 along the longitudinal axis 202. The flanges 250 can have a greater width than at least a portion of the pins 244 adjacent to the flanges 250, allowing the portion of the pins 244 to translate relative to the pin receivers 240 up to contact between the flanges 250 and the pin wall 236. The flanges 250 can be outside the chamber 232 (e.g., while the pins 244 are received in the pin receivers 240). The pins 244 can be fixed (e.g., riveted) to the pin wall 236.

The pins 244 can have a greater length (e.g., in a direction along the longitudinal axis 202) relative to a width or diameter (e.g., in a direction transverse to the longitudinal axis). The pins 244 can be cylindrical.

The sprinkler 108 includes a deflector 248. The deflector 248 can receive fluid from the channel 212 and output the fluid according to a target spray pattern. The target spray pattern can correspond with an application of the sprinkler 108, such as an orientation of the sprinkler 108 relative to a room in which the sprinkler 108 is located, or a shape of the room. The target spray pattern can correspond with structural features of the deflector 248 as described herein. The deflector 248 can include various tines, edges, openings, angled members, or other features to cause the fluid to be outputted with the target spray pattern as the fluid comes into contact with the deflector 248.

The deflector 248 can move along the pins 244, such as to move from an undeployed state to a deployed state (depicted in FIG. 2). The deflector 248 can be slidingly coupled with the pins 244. The undeployed state can be a state in which at least a portion of the deflector 248 is relatively closer to the pin wall 236 than in the deployed state, such as if the deflector 248 is received within the chamber 232 to an extent that the deflector 248 does not extend beyond an end wall 252 of the body 224, which can facilitate a minimal form factor for the sprinkler 108. The end wall 252 can form an edge of the body wall 228. A majority (e.g., at least fifty percent; at least eighty percent) of the length of the pins 244 can be in the chamber 232 while the deflector 248 is in each of the undeployed state and the deployed state.

The undeployed state can correspond to various positions along the longitudinal axis 202 to allow for flexible installation of the sprinkler 108. For example, the sprinkler 108 can be more flexibly installed by allowing the relative distance between the deflector 248 and the end wall 252 (or pin wall 236) to be adjusted during installation, such as to allow the sprinkler 108 to be sufficiently recessed into a ceiling or wall while positioning the deflector 248 in a target position for undeployed state.

The deflector 248 can include at least one deflector arm 256. The deflector arms 256 can extend outward relative to the longitudinal axis 202 (e.g., when the deflector 248 is coupled with the pins 244). The deflector arms 256 can be symmetrical about the longitudinal axis 202. The at least one deflector arm 256 can include one deflector arm 256 for each pin 244.

The deflector arm 256 can include a receiver 260 (e.g., sleeve) sized to receive the pin 244 (e.g., rather than riveting the pins 244 to the deflector arms 256). The receivers 260 can allow the deflector 248 to move along the pins 244, such as to move between the undeployed state and the deployed state. The receivers 260 can have an inner diameter greater than a minimum outer diameter of the pins 244 to allow the deflector arms 256 to slide along the pins 244.

At least one of the length (e.g. receiver length 262 discussed below), inner diameter, and surface area of the receivers 260 and a respective at least one of the minimum outer diameter and surface area of the pins 244 can be within a threshold difference of one another to form a frictional engagement between the pins 244 and receivers 260 having a force that is greater than a first force threshold to prevent inadvertent movement of the deflector 248 relative to the pins 244 (e.g., so that the weight of the deflector 248 while the longitudinal axis 202 is aligned with a direction of gravity is not sufficient to cause the deflector 248 to slide along the pins 244) and less than a second force threshold to allow for the deflector 248 to be moved along the pins 244 by hand (e.g., when installing the sprinkler 108) (and also less than a third force threshold that is greater than the second force threshold, the third force threshold corresponding to a force applied by fluid outputted through the channel 216 against the deflector 248 responsive to the seal breaking).

Ends of the pins 244 opposite the flanges 250 can have a relatively greater diameter to define a maximum linear motion of the deflector 248 (e.g., prevent the deflector from moving off the pins 244). The receivers 260 can define a receiver length 262 along which the pins 244 are received. The receiver length 262 (e.g., along with diameters as described above) can be sized to enable a smooth transition between the undeployed and deployed states, such as to reduce frictional binding between the receivers 260 and the pins 244 that would otherwise cause the force of the frictional engagement to be greater than the third threshold. For example, the receiver length 262 can be greater than the diameter of the receiver 260. A ratio of the receiver length 262 to the diameter of the receiver 260 can be greater than 1 and less than 2.

The deflector 248 can move along the pins 244 from the undeployed state to the deployed state responsive to a trigger condition. The trigger condition can be associated with a fire condition. For example, the sprinkler 108 can include a thermally responsive trigger (not shown), such as a fusible link or a glass bulb that breaks responsive to a temperature around the thermally responsive trigger being greater than a threshold temperature indicative of the fire condition. Responsive to breaking, the thermally responsive trigger can release the deflector 248, such as by releasing a seal coupled with at least one of the chamber 232 and the deflector 248, allowing the deflector 248 to move along the pins 244 from the undeployed state to the deployed state (e.g., responsive to fluid driving the deflector 248). For example, pressure from fluid in the channel 212 (which was previously sealed) can drive the deflector 248 to the deployed state.

By allowing the deflector 248 to move along the pins 244, the sprinkler 108 can be installed with greater flexibility. For example, the position of the sprinkler 108 along the longitudinal axis 202 relative to the pipes 112 and other structures (e.g., walls) that the sprinkler 108 is coupled with or positioned nearby can be adjusted based on where the deflector 248 is positioned along the pins 244 in the undeployed state, such as to allow the sprinkler 108 to be concealed (e.g., behind a cover) or otherwise retracted when installed, yet still able to move to an appropriate position in the deployed state in order to achieve the target spray pattern during operation.

As depicted in FIG. 2, the deflector 248 can include a plate 264 and a plurality of tines 268, such as for a horizontal sidewall application. In various applications, the deflector 248 can include various such structures. The plate 264 and tines 268 can deflect the fluid received through channel 212 according to the target spray pattern.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced. Other substitutions, modifications, changes, and omissions may be made in the design, operating conditions and arrangement of embodiments without departing from the scope of the present disclosure.

As utilized herein, the terms "approximately," "about," "substantially", and similar terms are intended to include any given ranges or numbers+/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A sprinkler, comprising:
- a connector extending between an inlet end and an outlet end;
- a body comprising:
  - a pin wall integral with and extending from the outlet end of the connector, the pin wall defining at least one pin receiver; and
  - a body wall extending from the pin wall, the pin wall and the body wall define a chamber;

at least one pin comprising a first pin end fixed with the at least one pin receiver and a second pin end opposite the first pin end, the second pin end having a greater diameter than the first pin end; and a deflector coupled with the at least one pin to move within the chamber along the at least one pin responsive to a trigger condition from an undeployed state to a deployed state.

2. The sprinkler of claim 1, comprising:

the connector defines a longitudinal axis; and the deflector moves along the at least one pin in a direction parallel with the longitudinal axis.

3. The sprinkler of claim 1, comprising:

the body comprises an end wall extending from the body wall; and the deflector positioned in the chamber and does not extend beyond the end wall in the undeployed state.

4. The sprinkler of claim 1, comprising:

the connector defines a longitudinal axis;

the at least one pin receiver comprises a plurality of pin receivers radially outward from the longitudinal axis; and the at least one pin comprises a plurality of pins radially outward from the longitudinal axis.

5. The sprinkler of claim 1, comprising:

the deflector comprises at least one deflector receiver arranged around the at least one pin, the at least one deflector receiver having a length greater than a diameter.

6. The sprinkler of claim 1, comprising:

the deflector comprises:

at least one deflector arm defining a receiver to receive the at least one pin inside the receiver; and a plurality of tines coupled with the at least one deflector arm.

7. The sprinkler of claim 1, comprising:

the second pin end of the at least one pin comprises a flange to restrict movement of the deflector.

8. The sprinkler of claim 1, comprising:

the deflector positioned in a horizontal concealed sidewall position.

9. A sprinkler system, comprising:

one or more pipes coupled with a fluid supply; and a sprinkler, comprising:

a connector extending between an inlet end and an outlet end;

a pin wall integral with and extending from the outlet end of the connector, the pin wall defining at least one pin receiver;

at least one pin comprising a first pin end fixed with the at least one pin receiver and a second pin end opposite the first pin end, the second pin end having a greater diameter than the first pin end; and a deflector coupled with the at least one pin to move along the at least one pin responsive to a trigger condition from an undeployed state to a deployed state.

10. The sprinkler system of claim 9, comprising:

the connector defines a longitudinal axis; and the deflector moves along the at least one pin in a direction parallel with the longitudinal axis.

11. The sprinkler system of claim 9, comprising:

the sprinkler comprises a body wall extending from the pin wall and an end wall at an edge of the body wall opposite the pin wall, the pin wall, the body wall, and the end wall define a chamber coupled with the connector; and the deflector positioned in the chamber and does not extend beyond the end wall in the undeployed state.

12. The sprinkler system of claim 9, comprising:

the connector defines a longitudinal axis;

the at least one pin receiver comprises a plurality of pin receivers radially outward from the longitudinal axis; and the at least one pin comprises a plurality of pins radially outward from the longitudinal axis.

13. The sprinkler system of claim 9, comprising:

the pin wall extends radially outward from the connector.

14. The sprinkler system of claim 9, comprising:

the deflector comprises:

at least one deflector arm defining a receiver to receive the at least one pin; and a plurality of tines coupled with the at least one deflector arm.

15. The sprinkler system of claim 9, comprising:

the at least one pin comprises a flange to restrict movement of the deflector.

16. The sprinkler system of claim 9, comprising:

the deflector positioned in a horizontal concealed sidewall position.

17. A sprinkler, comprising:

a connector extending between an inlet end and an outlet end;

a body comprising:

a pin wall integral with and extending from the outlet end of the connector, the pin wall defining at least one pin receiver; and a body wall extending from the pin wall, the pin wall and the body wall define a chamber;

at least one pin fixed with the at least one pin receiver; and a deflector comprising an aperture in which the at least one pin is disposed to allow the deflector move within the chamber along the at least one pin responsive to a trigger condition from an undeployed state to a deployed state.

* * * * *